(12) United States Patent
Parker et al.

(10) Patent No.: US 8,398,141 B2
(45) Date of Patent: Mar. 19, 2013

(54) VEHICLE SEATING ARRANGEMENT FOR A VEHICLE SEAT INCLUDING A CANTILEVERED SECTION

(75) Inventors: Grey B. Parker, Columbus, OH (US); Trenton Hobbs, Marysville, OH (US); Tetsumei Mochizuki, Tochigi (JP); Rob Mangold, Delaware, OH (US)

(73) Assignee: Honda Motor Co., Ltd., Tokyo (JP)

( * ) Notice: Subject to any disclaimer, the term of this patent is extended or adjusted under 35 U.S.C. 154(b) by 245 days.

(21) Appl. No.: 12/965,359

(22) Filed: Dec. 10, 2010

(65) Prior Publication Data

US 2012/0146356 A1 Jun. 14, 2012

(51) Int. Cl.
*B60N 2/01* (2006.01)

(52) U.S. Cl. ............... 296/64; 296/65.13; 296/68.1

(58) Field of Classification Search ........... 296/65.03, 296/64, 68.1, 65.11, 65.13, 65.14, 65.15; 297/473, 483; *B60N 2/005, 2/01*
See application file for complete search history.

(56) References Cited

U.S. PATENT DOCUMENTS

| | | | |
|---|---|---|---|
| 3,944,276 A * | 3/1976 | de Rosa et al. ............ 296/65.13 |
| 4,036,527 A * | 7/1977 | Faul .......................... 297/452.39 |
| 4,818,022 A * | 4/1989 | Nishimura ................... 297/473 |
| 5,044,683 A * | 9/1991 | Parsson ....................... 296/65.09 |
| 5,322,348 A | 6/1994 | Johnson et al. |
| 5,411,319 A | 5/1995 | Kuiri |
| 5,785,387 A | 7/1998 | Hernandez et al. |
| 5,971,490 A | 10/1999 | Chang |
| 6,224,130 B1 * | 5/2001 | Sasaki et al. ............... 296/65.13 |
| 6,709,040 B1 | 3/2004 | Drew et al. |
| 7,438,354 B2 | 10/2008 | Moffa et al. |
| 2005/0127740 A1* | 6/2005 | Dowty ......................... 297/487 |
| 2009/0094807 A1 | 4/2009 | Sugimoto et al. |

* cited by examiner

*Primary Examiner* — Glenn Dayoan
*Assistant Examiner* — Pinel Romain
(74) *Attorney, Agent, or Firm* — Rankin Hill & Clark LLP

(57) ABSTRACT

A vehicle seating arrangement includes a first slide rail mounted to a vehicle floor, a second slide rail mounted to the floor, a multi-passenger seat mounted to the first slide rail and to the second slide rail, a restraining device on the multi-passenger seat, and a restraining rail connected with the floor. The multi-passenger seat moves in a fore and aft longitudinal direction and includes a cantilevered section extending from the second slide rail away from the first slide rail. The restraining device is located adjacent a lateral edge of the cantilevered section. The restraining rail connects with the floor spaced laterally from the second slide rail on an opposite side of the second slide rail as the first slide rail and cooperates with the restraining rail to limit at least one of lateral movement and upward vertical movement of the lateral edge of the cantilevered section.

20 Claims, 4 Drawing Sheets

VEHICLE SEATING ARRANGEMENT FOR A VEHICLE SEAT INCLUDING A CANTILEVERED SECTION

BACKGROUND

Larger passenger vehicles can include rear row (second row or third row) seating arrangements having two seats for three passengers. This rear row seating arrangement includes one single passenger seat and one multi-passenger seat, where the multi-passenger seat can be a seat known as a 60/40 seat.

The rear row seats, more particularly the second row seats, are slidable to allow for passenger ingress and egress and to allow for multiple locations where the seats can be offset from the front row seat to provide for more passenger comfort. The rear row seats typically mount on rails to allow for this longitudinal sliding in a fore and aft direction.

For a vehicle model that can incorporate both three person rear row seating and two person rear row seating, it is desirable that the slide rail mounting locations on a vehicle body be common for each seating arrangement. Common slide rail arrangements for each vehicle model can require a cantilevered seating section. Since three seatbelts are required for a three-person seating arrangement, anchoring the seat belt buckle for the cantilevered seating section can present a problem.

SUMMARY

An example of a seating arrangement for a vehicle that can overcome at least some of the aforementioned shortcomings includes a first slide rail mounted to a floor of the vehicle, a second slide rail mounted to the floor, a multi-passenger seat mounted to the first slide rail and to the second slide rail, a restraining device on the multi-passenger seat, and a restraining rail connected with the floor. The second slide rail mounts to the floor offset laterally from the first slide rail. The multi-passenger seat mounts to the first slide rail and to the second slide rail for fore and aft movement in a longitudinal direction. The multi-passenger seat includes a cantilevered section extending from the second slide rail away from the first slide rail. The restraining device is located on the multi-passenger seat adjacent a lateral edge of the cantilevered section. The restraining rail connects with the floor spaced laterally from the second slide rail on an opposite side of the second slide rail as the first slide rail. The restraining device cooperates with the restraining rail to limit at least one of lateral movement and upward vertical movement of the lateral edge of the cantilevered section with respect to the floor.

Another example of a seating arrangement for a vehicle that can overcome at least some of the aforementioned shortcomings includes at least one slide rail mounted to a floor of the vehicle, a restraining rail connected with the floor and offset laterally from the at least one slide rail, a seat mounted to the at least one slide rail for longitudinal fore and aft movement, and a restraining device on the seat. The seat includes a cantilevered section extending from the at least one slide rail toward the restraining rail. The restraining device is located on the seat adjacent a lateral edge of the cantilevered section. The restraining device slidingly engages the restraining rail when the seat is in a first position on the at least one slide rail and the restraining device is disengaged from the restraining rail when the seat is in a second position on the at least one slide rail. The seat locks to the at least one slide rail to preclude longitudinal movement of the seat with respect to the at least one slide rail when in the first position. The seat is not locked to the at least one slide rail such that longitudinal movement of the seat is not precluded when in the second position.

Another example of a seating arrangement for a vehicle that can overcome at least some of the aforementioned shortcomings includes a first slide rail mounted to a floor of the vehicle, a second slide rail mounted to the floor and offset laterally from the first slide rail, a restraining rail connected with the floor, a multi-passenger seat mounted to the first slide rail and to the second slide rail for fore and aft movement of the multi-passenger seat in a longitudinal direction with respect to the floor, a restraining device on a multi-passenger seat, a first seat belt buckle on the multi-passenger seat anchored to the restraining rail through the restraining device, and a second seatbelt buckle on the multi-passenger seat anchored to at least one of the first slide rail and the second slide rail. The restraining rail is offset laterally from the second slide rail on an opposite side of the second slide rail as the first slide rail. The multi-passenger seat includes a cantilevered section extending from the second slide rail toward the restraining rail.

DETAILED DESCRIPTION

Figure 1:
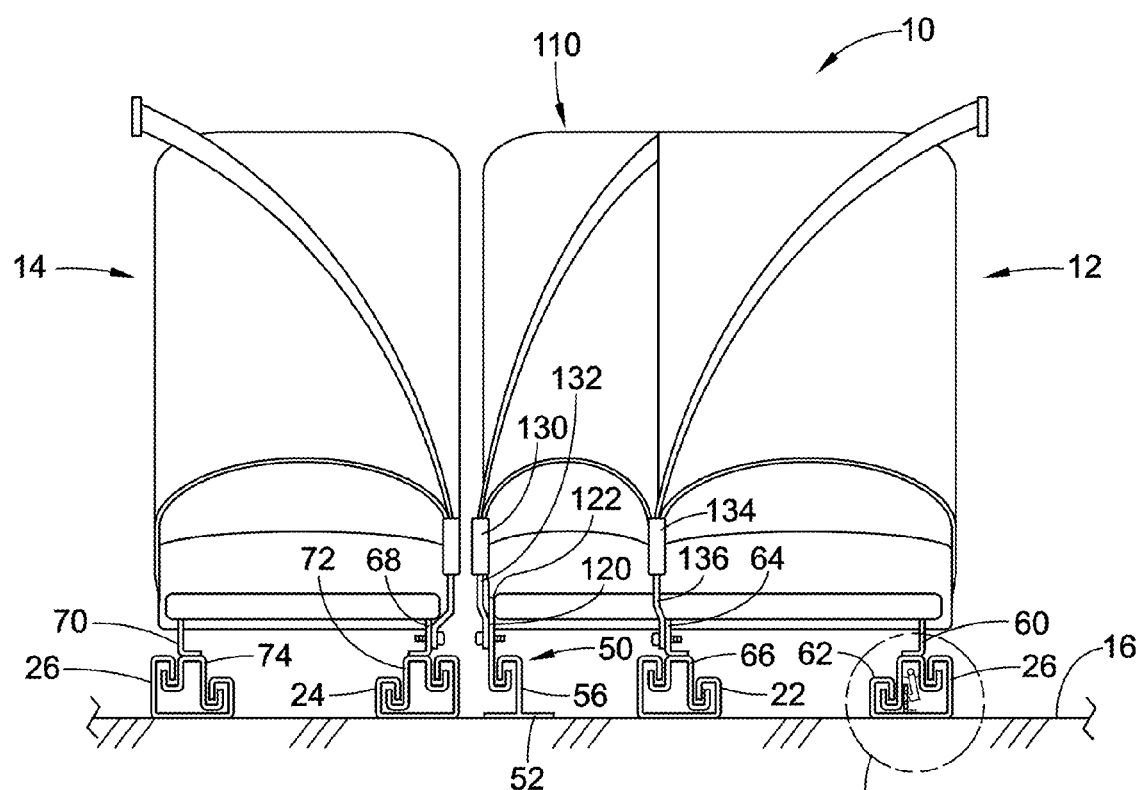
FIG. 1 is a schematic front view of a rear row vehicle seating arrangement.

With reference to FIG. 1, a seating arrangement 10 for a vehicle (not shown) includes a first vehicle seat 12 and a second, or additional, vehicle seat 14 mounted to a floor 16 of the vehicle. The seating arrangement 10 also includes a first slide rail 20 mounted to the floor 16 of the vehicle and a second slide rail 22 mounted to the floor and offset or spaced laterally from the first slide rail. The seating arrangement 10 also includes a third slide rail 24 and a fourth slide rail 26 that are both mounted to the floor 16 of the vehicle. Each of the slide rails 20, 22, 24 and 26 can have a similar configuration with the second slide rail 22 being a mirror image of the first slide rail 20 and the fourth slide rail 26 being a mirror image of the third slide rail 24. The slide rails 20, 22, 24 and 26 are arranged parallel to one another. Accordingly, only the first slide rail 20 will be described with particularity with an understanding that the remaining slide rails take a similar configuration. Moreover, the slide rails 20, 22, 24 and 26 are merely schematically depicted in the figures and the slide rails can take other configurations.

Figure 2:
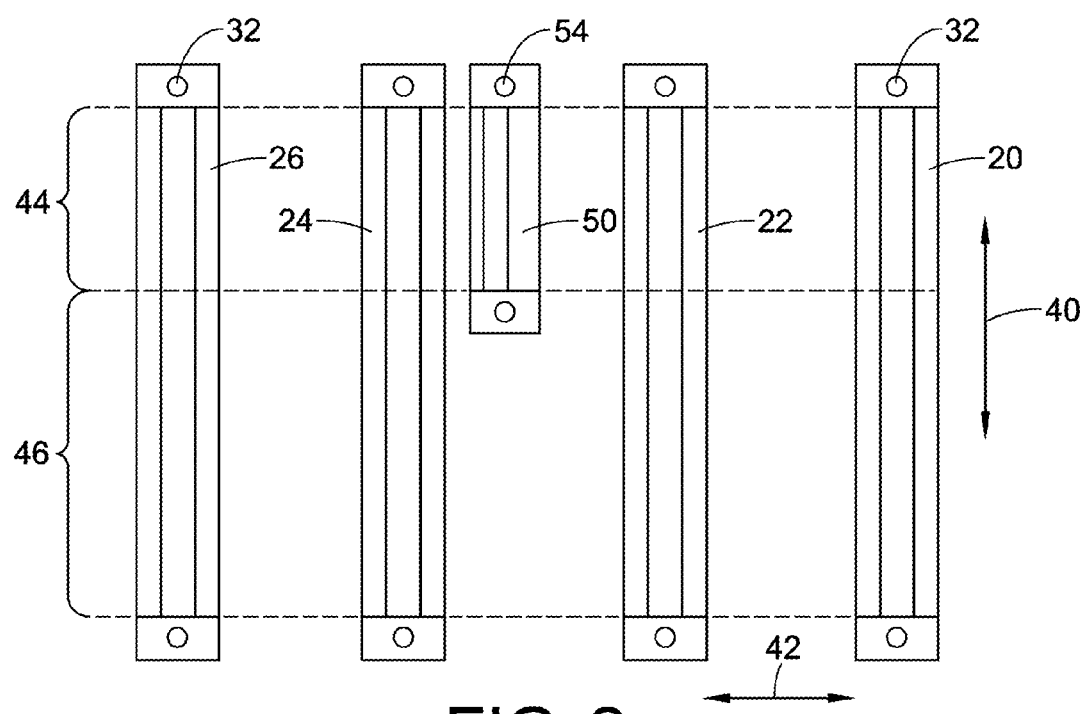
FIG. 2 is a schematic top view of slide rails for the vehicle seating arrangement depicted in FIG. 1.
Figure 1A:
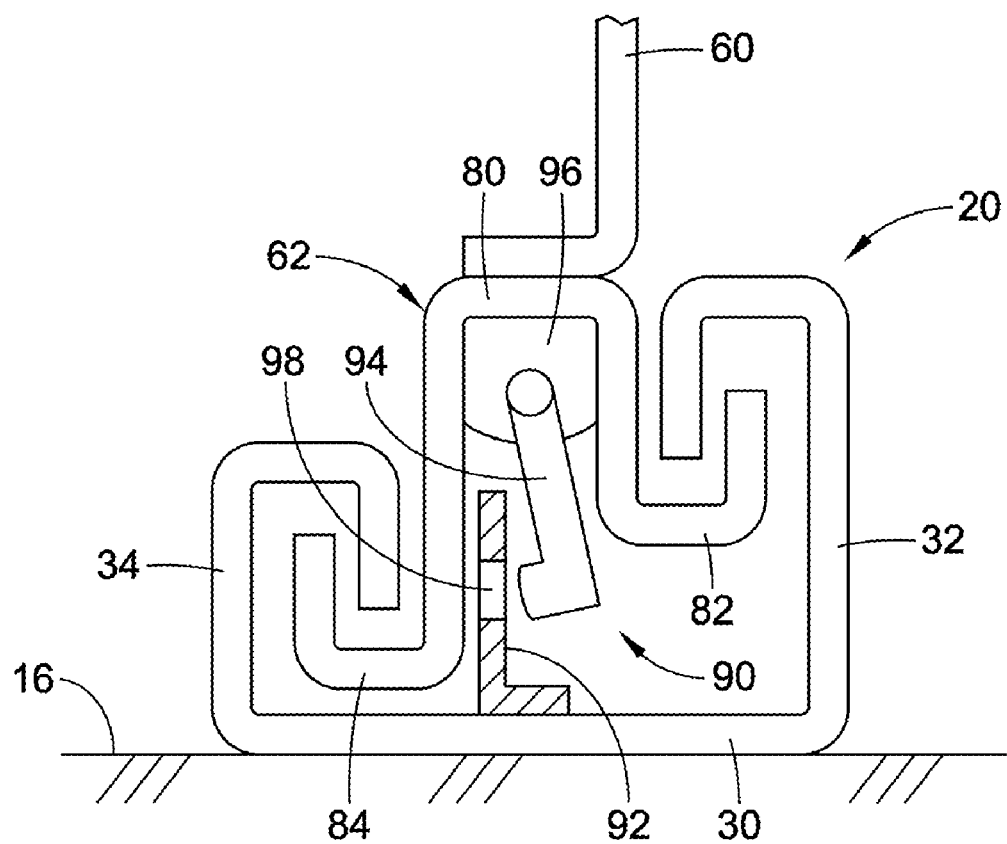
FIG. 1A is a close-up view of the circled portion of FIG. 1.

With reference to FIG. 1A, the first slide rail 20 can include a generally planar base 30 that contacts the floor 16 of the vehicle. With reference to FIG. 2, the base 30 can include openings 32 that receive fasteners (not shown) for attaching the first rail 20 to the vehicle floor 16. The rails 20, 22, 24 and 26 can attach to the floor 16 in other conventional manners. With reference back to FIG. 1A, the first slide rail 20 can also include a first inverted J-hooked portion 32 and a second inverted J-hooked portion 34 laterally spaced from the first inverted J-hooked portion. The inverted J-hooked portions 32, 34 extend upwardly from the base 30 and the floor 16. With reference back to FIG. 2, the rails 20, 22, 24 and 26 are elongated in a longitudinal direction 40. The longitudinal direction 40 generally coincides with a direction of travel for the vehicle. The slide rails 20, 22, 24 and 26 are also spaced from one another in a lateral direction 42, which is generally perpendicular to the longitudinal direction 40. As will be described in further detail below, the slide rails 20, 22, 24 and 26 include a comfort slide area 44 and an ingress/egress slide adjustment area 46. With specific reference to the multi-passenger seat 12 and the first rail 20 and the second rail 22, the first and second slide rails include the comfort slide area 44 which is where the multi-passenger seat 12 locks to at least one of the slide rails 20, 22 to inhibit longitudinal movement of the seat 12 with respect to the slide rails. The first and second slide rails 20, 22 also include the ingress/egress slide adjustment area 46 where the seat 12 is slidable with respect to and not locked to the slide rails 20, 22. Further explanation of this will be provided below. The third and fourth slide rails 24, 26 can also include the comfort slide area 44 and the ingress/egress slide adjustment area 46.

With continued reference to FIG. 2, the seating arrangement 10 also includes a restraining rail 50 connected with the floor 16 of the vehicle and spaced or offset laterally from the second slide rail 22 on an opposite side of the second slide rail as the first slide rail 20. The restraining rail 50 operates as part of an assembly to provide frame reinforcement to the multi-passenger seat 12 in a manner that will be described in more detail below. In the embodiment illustrated in FIG. 1, the restraining rail 50 includes a substantially planar base 52 that includes openings 54 for attaching the restraining rail to the floor 16 of the vehicle. The restraining rail 50 can attach to the vehicle floor 16 in other conventional manners that allow the restraining rail to be fixed with respect to the vehicle floor. The restraining rail 50 also includes an inverted J-hooked member 56 that extends upwardly from the base 52. As more clearly seen in FIG. 2, the first and second slide rails 20, 22, as well as the second and third slide rails 24, 26, are longer than the restraining rail 50 in the longitudinal direction 40. The restraining rail 50 is elongated in the longitudinal direction 40 and the inverted J-hooked portion 56 has a longitudinal dimension that is about equal to the longitudinal dimension of the comfort slide area 44. In the embodiment illustrated in FIG. 1, the restraining rail 50 is located closer to the third slide rail 24 than the second slide rail 22 in the lateral direction 42.

With reference back to FIG. 1, the multi-passenger seat 12 includes a first (outboard) riser 60 that is rigidly secured to a rigid frame member (not visible) of the multi-passenger seat 12 and an upper rail 62 that slidingly engages the first slide rail 20. The multi-passenger vehicle seat 12 also includes a second riser 64 that is rigidly secured to a rigid internal frame member (not visible) of the vehicle seat 12 and a second upper rail 66. The first upper rail 62 engages the first slide rail 20 in a similar manner to the manner in which the second upper rail 66 engages the second slide rail 22. Moreover, the second seat 14 also includes risers 68, 70 and rails 72, 74 that engage each other in a manner similar to engagement between the first upper rail 62 and the first slide rail 20. Accordingly, engagement between the first upper rail 62 and the first slide rail 20 will be described in particularity with reference to FIG. 1A with the understanding that the upper rails and slide rails can cooperate in a similar manner.

With reference to FIG. 1A, the upper rail 62 includes a generally planar base 80 to which the first riser 60 is fastened in a conventional manner. The upper rail 62 also includes a first J-hooked portion 82 that depends downwardly from an outboard edge of the base 80 and a second J-hooked portion 84 that depends downwardly from an inboard edge of the base. The first J-hooked portion 82 of the upper rail 62 cooperates with the first inverted J-hooked portion 32 of the slide rail 20 to prevent movement of the multi-passenger vehicle seat 12 in the lateral direction 42. Similarly, the second J-hooked portion 84 of the first upper rail 62 cooperates with the second inverted J-hooked portion 34 of the first slide rail 20 to prevent movement of the seat 12 in the lateral direction 42. During normal operation, the first upper rail 62 slidingly engages the first slide rail 20 such that the first upper slide rail 62 need not actually contact the first lower rail 20 to inhibit frictional interference upon sliding movement between the first upper rail 62 and the first slide rail 20.

With reference back to FIG. 2, as explained above, the slide rails 20, 22, 24 and 26 each include a comfort slide area 44 where the respective seat 12, 14 locks to the slide rails at selected locations along the slide rail to inhibit longitudinal movement of the seat with respect to the slide rails. The slide rails 20, 22, 24 and 26 also include an ingress/egress slide adjustment area 46 where the respective seat is slidable with respect to and not locked to the slide rails. With reference back to FIG. 1A, an example of a locking mechanism 90 is depicted that can lock the multi-passenger seat 12 with respect to the first slide rail 20. The locking mechanism 90 depicted in FIG. 1A is only one example of such a locking mechanism. Other conventional locking mechanisms can be employed, especially where the first slide rail 20 (or other slide rails) and the upper rail 62 (and other upper rails) may take another configuration. Moreover, a similar locking mechanism can be provided to lock the second seat 14 with respect to the rails 24 and 26.

With reference back to FIG. 1A, a locking plate 92 is fixed to the first slide rail 20 and is disposed between the J-hooked portions 82 and 84 of the upper rail 62. A biased hook 94, which can be operably connected to an operator actuated latch handle (not shown), connects to the first upper rail 62 via a flange 96. The locking plate 92 includes a plurality of openings 98 (only one of which is shown in FIG. 1A) along the comfort slide area 44 (FIG. 2) of the first slide rail 20. The hook 94 is biased towards the opening 90 such that the operator actuates the handle to disengage the hook from the opening to allow for longitudinal fore and aft movement of the multi-passenger seat 12 with respect to the floor 16 of the vehicle. Openings similar to the openings 98 are not provided in the ingress/egress slide adjustment area 46 of the first slide rail 20 so that the seat 12 is slidable with respect to and not locked to the slide rail 20, 22 when the seat is pushed forward into the ingress/egress slide adjustment area.

With reference back to FIG. 1, the multi-passenger seat 12 includes a cantilevered section 110 that extends from the second slide rail 22 toward the restraining rail 50 and away from the first slide rail 20. In the illustrative embodiment, the cantilevered section 110 accounts for at least about 40% of a total lateral dimension of the multi-passenger seat 12. In other words, the cantilevered section 110 can account for at least about 40% of a total seating area for the multi-passenger seat 12.

The seating arrangement 10 also includes a restraining device 120 on the multi-passenger seat 12 adjacent a free (inboard lateral) edge 122 of the cantilevered section 110. The restraining device 120 cooperates with the restraining rail 50 to limit at least one of lateral movement and upward vertical movement of the free edge 122 of the cantilevered section 110 with respect to the floor 16 while not inhibiting downward vertical movement of the free edge of the cantilevered section with respect to the floor. In the illustrated embodiment, the restraining rail 50 is positioned with respect to the multi-passenger seat to cooperate with the restraining device 120 to limit both lateral movement and upward vertical movement of the free edge 122 of the cantilevered section 110 with respect to the floor 16 while permitting downward vertical movement of the free edge of the cantilevered section with respect to the floor.

The restraining device 120 depicted in FIG. 1 is a generally J-hooked bracket that is connected with and extends downwardly from a rigid frame member (not shown) of the first seat 12. The restraining device 120 slidingly engages the inverted J-hooked portion 56 of the restraining rail 50 such that in normal operation the restraining device 120 does not actually contact the inverted J-hooked member 56 of the restraining rail 50 so that frictional interference upon sliding of the first seat 12 is not inhibited by an engaging contact between the restraining device 120 and the restraining rail 50. However, during a side impact event, the restraining device 120 can engage with the restraining rail 50 to inhibit lateral movement of the free edge 122 of the cantilevered section as well as limit upward vertical movement, or peeling, of the free edge. The restraining device 120 does not contact the restraining rail 50 in normal operation. Instead, the restraining device 120 only contacts the restraining rail 50 during a crash event or other event that deforms the vehicle floor 16.

The seating arrangement 10 also includes a first seatbelt buckle 130 adjacent the free edge 122 of the cantilevered section 110 that is anchored to the restraining rail 50 through the restraining device 120. The first seatbelt buckle 130 is rigidly fixed to the restraining device 120 such that the first seatbelt buckle slides along with the first seat 12 when the first seat is moved in the longitudinal direction 40. The first seatbelt buckle 130 connects with a bracket 132 that connects to the restraining device 120. The seating arrangement 10 further includes a second seatbelt buckle 134 that is anchored to at least one of the first slide rail 20 and the second side rail 22. In the illustrated embodiment, the second seatbelt buckle 134 is anchored to the second slide rail 22 through a bracket 136. Accordingly, each of the seatbelt buckles 130 and 134 associated with the first seat 12 are anchored to the floor 16 of the vehicle. Each of the seatbelt buckles 130 and 134 can also slide along with the vehicle seat 12.

As seen when viewing FIGS. 1 and 2, the restraining device 120 slidingly engages the restraining rail 50 when the seat is in a first position on at least one of the slide rails 20 and 22. When in the first position, e.g. when the first seat 12 is located on the slide adjustment area 44, the seat 12 locks to at least one of the slide rails 20 and 22 to preclude longitudinal movement of the seat with respect to the slide rails. With additional reference to FIG. 1A, when the locking mechanism 90 is disposed along the comfort slide area 44 of the first slide rail 20, the first seat 12 can be locked to the first slide rail 20 such that longitudinal movement of the first seat 12 with respect to the slide rails 20 and 22 is precluded. When the seat 12 is in a second position on at least one of the slide rails 20 and 22, the seat 12 is not locked to the slide rails such that longitudinal movement of the seat is not precluded. With reference back to FIGS. 1 and 2, when the locking mechanism 90 is located in the ingress/egress slide adjustment area 46, the first seat 12 is slidable with respect to and not locked to the slide rails 20 and 22 and the restraining device 120 is disengaged from the restraining rail 50. Such a configuration limits longitudinal dimension of the restraining rail 50 to facilitate easier ingress and egress for passengers and mitigates the likelihood that a passenger can trip over the restraining rail.

Figure 3:
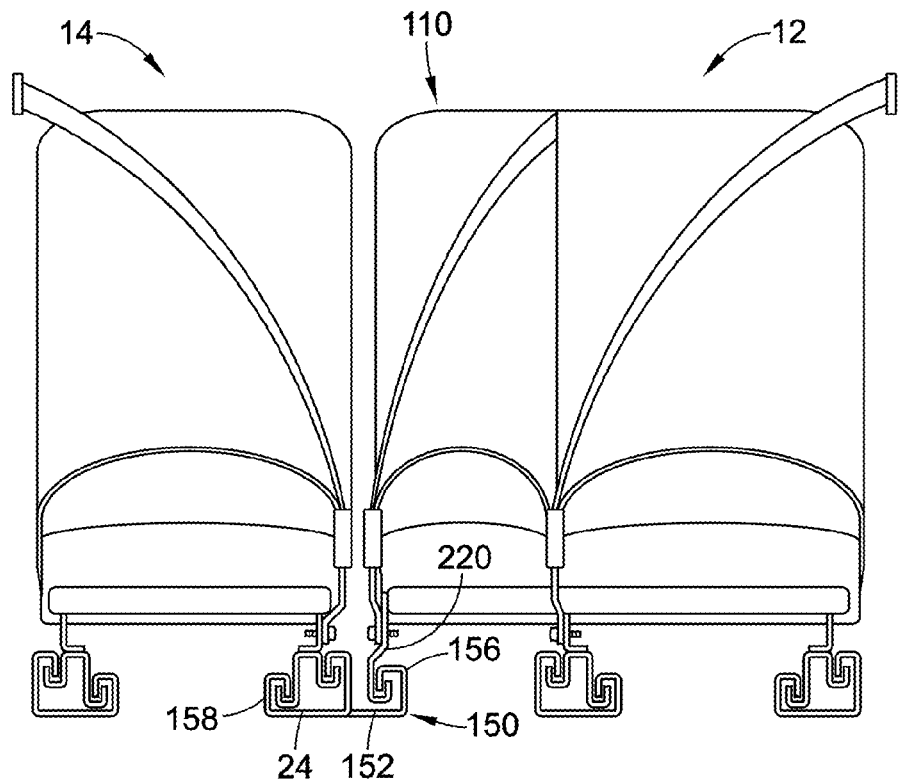
FIG. 3 is a schematic front view of an alternative rear row seating arrangement similar to the rear row seating arrangement shown in FIG. 1.

The restraining rail 50 and the restraining device 120 described with reference to FIGS. 1 and 2 can take many different configurations. For example, with reference to FIG. 3, a restraining rail 150 is depicted extending from the third slide rail 24. The restraining rail 150 includes a base 152 that mounts to the floor (not depicted in FIG. 3) of the vehicle. The restraining rail 150 also includes an inverted J-hooked member 156 that cooperates with a restraining device 220. In the embodiment depicted in FIG. 3, the restraining rail 150 can be integrally formed with the third slide rail 24 such that the base 152 is generally coplanar with a base 158 of the third slide rail 24. Similar to the embodiment depicted in FIG. 1, the restraining rail 150 can be shorter in the longitudinal direction 40 (FIG. 2) than the slide rails 20, 22, 24 and 26. The restraining rail 150 is elongated in the longitudinal direction 40 and the inverted J-hooked portion 156 has a longitudinal dimension that is about equal to the longitudinal dimension of the comfort slide area 44 (FIG. 2). The restraining device 220 can be slightly differently shaped, e.g. include a slight bend, as compared to the restraining device 120 depicted in FIG. 1. The restraining device 220, however, cooperates in the same manner with the restraining rail 150 as the restraining device 120 cooperates with the restraining rail 50.

Figure 4:
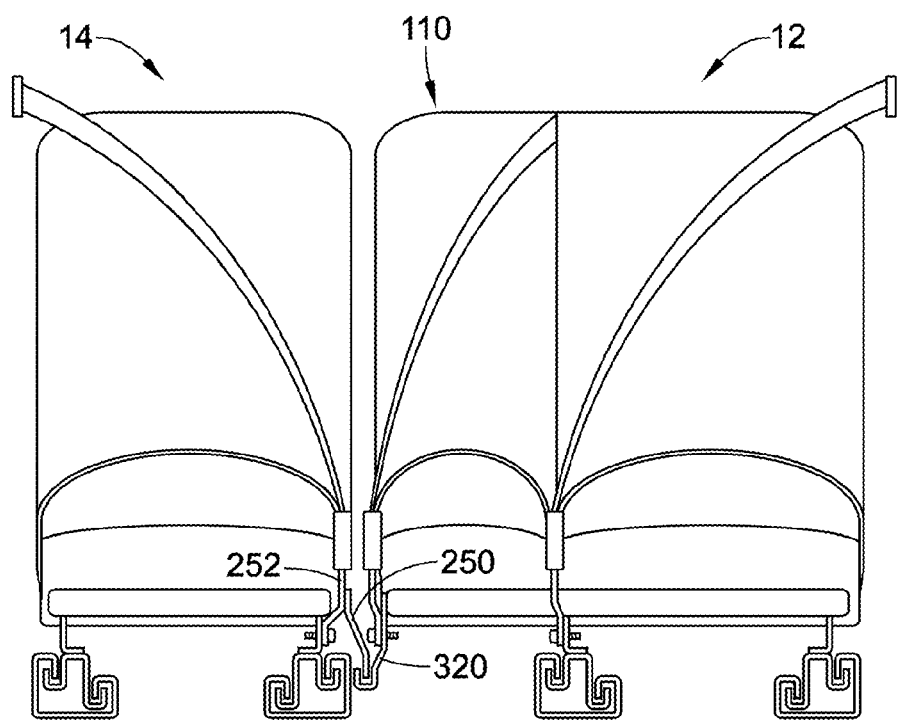
FIG. 4 is a schematic front view of another alternative rear row seating arrangement similar to the rear row seating arrangement shown in FIG. 1.

FIG. 4 depicts another alternative embodiment of a restraining rail 250. In the embodiment depicted in FIG. 4, the restraining rail 250 can extend downwardly from a rigid frame member of the second seat 14. The restraining rail 250 can be a thin elongated plate-like member that engages a restraining device 320. In this embodiment, the restraining rail 250 is anchored to the floor 16 of the vehicle through a bracket 252, the riser 68 and the upper rail 72 of the second seat 14. The bracket 252, similar to the brackets 132 and 136 in FIG. 1, fastens to the riser 68. The restraining device 320 can be slightly differently shaped, e.g. the J-hooked portion can be oriented in an opposite direction, as compared to the restraining device 120 depicted in FIG. 1. The restraining device 320, however, cooperates in the same manner with the restraining rail 250 as the restraining device 120 cooperates with the restraining rail 50, e.g. the restraining device 320 and the restraining rail 250 cooperate to limit vertical upward and lateral movement of the free end of the cantilevered section 110. Similar to the embodiment described in FIG. 3, the restraining rail 250 can be shorter in a longitudinal direction than the slide rails 20, 22, 24 and 26. The restraining rail 250 is elongated in the longitudinal direction 40 (FIG. 2) and has a longitudinal dimension that is about equal to the longitudinal dimension of the comfort slide area 44 (FIG. 2).

Figure 5:
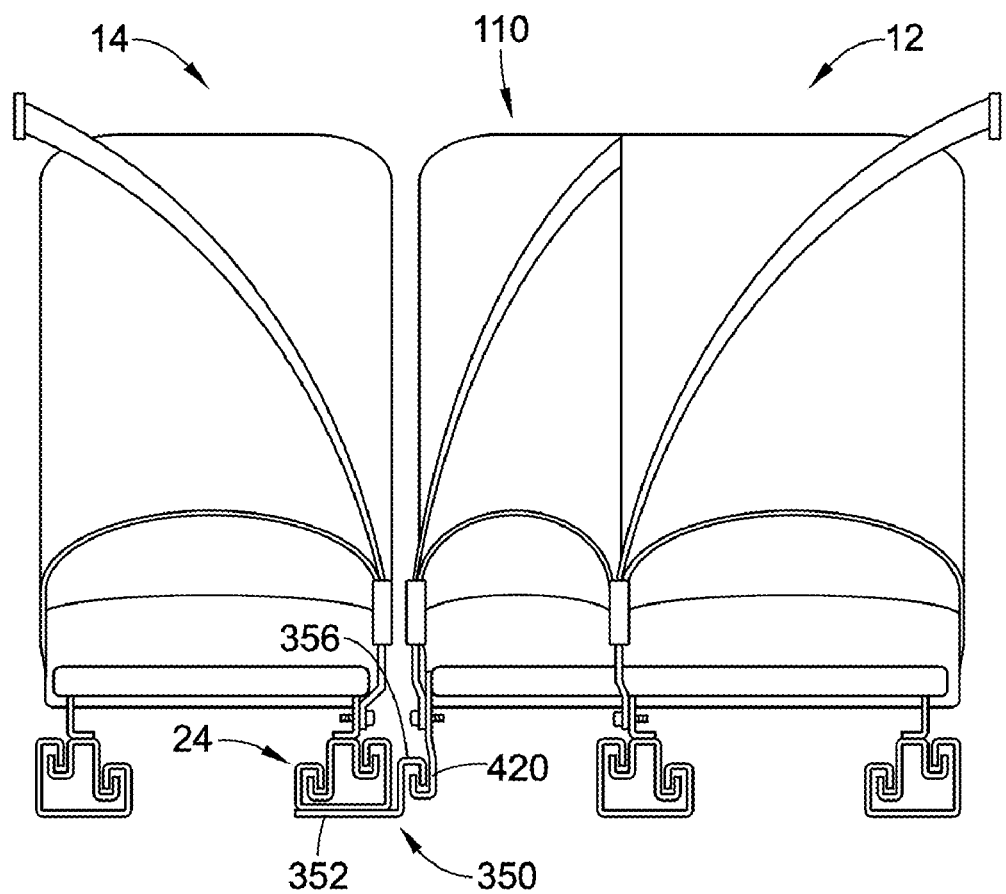
FIG. 5 is a schematic front view of another alternative rear row seating arrangement similar to the rear row seating arrangement shown in FIG. 1.

Another alternative embodiment of a restraining rail 350 and a restraining device 420 is depicted in FIG. 5. In this embodiment, the restraining rail 350 extends from the third rail 24, but is not integrally formed with the third rail. Instead, the restraining rail 250 includes a flange 352, similar to the base 52 (FIG. 1) and the base 152 (FIG. 3), that is disposed beneath the third rail 24 and mounts to the floor (not shown in FIG. 5) of the vehicle. The restraining rail 350 also includes an inverted J-hooked member 356 that cooperates with the restraining device 120. The restraining rail 350 is elongated in the longitudinal direction 40 (FIG. 2) and an inverted J-hooked portion 356 of the restraining rail has a longitudinal dimension that is about equal to the longitudinal dimension of the comfort slide area 44 (FIG. 2). The restraining device 420 can be slightly differently shaped as compared to the restraining device 120 depicted in FIG. 1. For example, the J-hooked portion can be oriented in an opposite direction as compared to the restraining device 120 shown in FIG. 1. The restraining device 420, however, cooperates in the same manner with the restraining rail 350 as the restraining device 120 cooperates with the restraining rail 50, e.g. the restraining device 420 and the restraining rail 350 cooperate to limit vertical upward and lateral movement of the free end of the cantilevered section 110.

Seating arrangements for a vehicle have been described above with particularity. Modifications and alterations will occur to those upon reading and understanding the preceding detailed description. The appended claims, however, are not limited to only the embodiments described above. The invention is broadly defined by the appended claims and the equivalents thereof.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A seating arrangement for a vehicle comprising:
a first slide rail mounted to a floor of the vehicle;
a second slide rail mounted to the floor and offset laterally from the first slide rail;
a multi-passenger seat mounted to the first slide rail and to the second slide rail for fore and aft movement of the multi-passenger seat in a longitudinal direction with respect to the floor, the multi-passenger seat including a cantilevered section extending from the second slide rail away from the first slide rail;
a restraining device on the multi-passenger seat adjacent a lateral edge of the cantilevered section; and
a restraining rail connected with the floor and offset laterally from the second slide rail on an opposite side of the second slide rail as the first slide rail, the restraining rail being positioned with respect to the multi-passenger seat to cooperate with the restraining device to limit at least one of lateral movement and upward vertical movement of the lateral edge of the cantilevered section with respect to the floor.

2. The seating arrangement of claim 1, wherein the first and second slide rails are longer than the restraining rail in the longitudinal direction.

3. The seating arrangement of claim 1, wherein the first and second slide rails include a comfort slide area where the multi-passenger seat locks to the slide rails to inhibit longitudinal movement of the seat with respect to the slide rails and an ingress/egress slide adjustment area where the seat is slidable with respect to and not locked to the slide rails, wherein the restraining device is disengaged from the restraining rail when the seat is in the ingress/egress slide adjustment area.

4. The seating arrangement of claim 1, wherein the restraining device does not contact the restraining rail in normal operation, and the restraining device only contacts the restraining rail during a crash event or other event that deforms the vehicle floor.

5. The seating arrangement of claim 1, wherein the restraining rail includes an inverted J-hooked portion that extends upwardly from the floor.

6. The seating arrangement of claim 5, wherein the first and second slide rails include a comfort slide area where the multi-passenger seat locks to the slide rails to inhibit longitudinal movement of the seat with respect to the slide rails and an ingress/egress slide adjustment area where the seat is slidable with respect to and not locked to the slide rails, wherein the inverted J-hooked portion has a longitudinal dimension about equal to a longitudinal dimension of the comfort slide area.

7. The seating arrangement of claim 1, further comprising a third slide rail mounted to the floor and laterally offset from the second slide rail for cooperating with an additional seat, wherein the restraining rail extends from the third rail.

8. The seating arrangement of claim 7, wherein the restraining rail is integrally formed with the third rail.

9. The seating arrangement of claim 7, wherein the restraining rail includes a flange disposed beneath the third rail and mounted to the floor.

10. The seating arrangement of claim 1, further comprising a third slide rail mounted to the floor and laterally offset from the second slide rail for cooperating with an additional seat, wherein the restraining rail is located closer to the third side rail as compared to the second slide rail.

11. The seating arrangement of claim 1, wherein the restraining rail is positioned with respect to the multi-passenger seat to cooperate with the restraining device to limit both lateral movement and upward vertical movement of the lateral edge of the cantilevered section with respect to the floor while permitting downward vertical movement of the lateral edge of the cantilevered section with respect to the floor.

12. The seating arrangement of claim 1, further comprising a first seatbelt buckle adjacent the lateral edge of the cantilevered section anchored to the restraining rail through the restraining device.

13. The seating arrangement of claim 11, further comprising a second seatbelt buckle anchored to the second slide rail.

14. A seating arrangement for a vehicle comprising:
at least one slide rail mounted to a floor of the vehicle;
a restraining rail connected with the floor and offset laterally from the at least one slide rail;
a seat mounted to the at least one slide rail for longitudinal fore and aft movement, the seat including a cantilevered section extending from the at least one slide rail toward the restraining rail;
a restraining device on the seat adjacent a lateral edge of the cantilevered section, wherein the restraining device slidingly engages the restraining rail when the seat is in a first position on the at least one slide rail and the restraining device is disengaged from the restraining rail when the seat is in a second position, wherein the seat locks to the at least one slide rail to preclude longitudinal movement of the seat with respect to the at least one slide rail when in the first position, wherein the seat is not locked to the at least one slide rail such that longitudinal movement of the seat is not precluded when in the second position.

15. The seating arrangement of claim 14, further comprising a first seatbelt buckle adjacent the lateral edge of the cantilevered section anchored to the restraining rail through the restraining device and a second seatbelt buckle anchored to the at least one slide rail.

16. The seating arrangement of claim 14, further comprising a second seat slide rail mounted to the floor and laterally offset from the at least one slide rail, wherein the second seat slide rail cooperates with a second seat, wherein the restraining rail is located closer to the second seat side rail as compared to the at least one slide rail.

17. The seating arrangement of claim 16, wherein the seat is a multi-passenger seat and the cantilevered section accounts for at least about 40% of a total seating area for the seat.

18. A seating arrangement for a vehicle comprising:
a first slide rail mounted to a floor of the vehicle;

a second slide rail mounted to the floor and offset laterally from the first slide rail;

a restraining rail connected with the floor and offset laterally from the second slide rail on an opposite side of the second slide rail as the first slide rail;

a multi-passenger seat mounted to the first slide rail and to the second slide rail for fore and aft movement of the multi-passenger seat in a longitudinal direction with respect to the floor, the multi-passenger seat including a cantilevered section extending from the second slide rail toward the restraining rail;

a restraining device on the multi-passenger seat adjacent a lateral edge of the cantilevered section slidingly engaging the restraining rail;

a first seatbelt buckle on the multi-passenger seat anchored to the restraining rail through the restraining device; and a second seatbelt buckle on the multi-passenger seat anchored to at least one of the first slide rail and the second slide rail.

19. The seating arrangement of claim 18, wherein the first and second slide rails include a comfort slide area where the multi-passenger seat locks to the slide rails to inhibit longitudinal movement of the seat with respect to the slide rails and an ingress/egress slide adjustment area where the seat is slidable with respect to and not locked to the slide rails, wherein the restraining device is disengaged from the restraining rail when the seat is in the ingress/egress slide adjustment area.

20. The seating arrangement of claim 18, further comprising a third slide rail mounted to the floor and laterally offset from the second slide rail for cooperating with an additional seat, wherein the restraining rail is located closer to the third side rail as compared to the second slide rail.

* * * * *